United States Patent [19]

Kemner et al.

[11] 4,233,633
[45] Nov. 11, 1980

[54] TELEVISION PICK-UP DEVICE SUITABLE FOR A DISCONTINUOUS RECORDING OF INFORMATION DURING CONTINUOUS OPERATION

[75] Inventors: Rudolf Kemner; Rudy R. Cramer, both of Eindhoven, Netherlands

[73] Assignee: U.S. Philips Corporation, New York, N.Y.

[21] Appl. No.: 972,604

[22] Filed: Dec. 22, 1978

[30] Foreign Application Priority Data

Jun. 5, 1978 [NL] Netherlands ............... 7806074

[51] Int. Cl.³ .................... H04N 5/34; H04N 5/32
[52] U.S. Cl. ........................... 358/221; 358/111; 358/217
[58] Field of Search ............ 358/111, 209, 217, 221, 358/223

[56] References Cited

U.S. PATENT DOCUMENTS 3,602,641   8/1971   Heise .................... 358/221

Primary Examiner—John C. Martin
Attorney, Agent, or Firm—T. A. Briody; Edward W. Goodman

[57] ABSTRACT

A television pick-up device suitable for a discontinuous recording of information during continuous operation, such as, for example, in X-ray television. When information recording is interrupted at a continuing field scanning of a target plate in the pick-up tube, the cathode thereof is supplied from a supply circuit with a higher voltage than during the field scanning during information recording. As a result thereof a negative charging of the free surface of the target plate by the more rapid electrons in the electron beam is prevented, so that at the next recording of information the picture quality on display is not poorer due to signal clipping.

6 Claims, 2 Drawing Figures

TELEVISION PICK-UP DEVICE SUITABLE FOR A DISCONTINUOUS RECORDING OF INFORMATION DURING CONTINUOUS OPERATION

BACKGROUND OF THE INVENTION

The invention relates to a television pick-up device suitable for a discontinuous recording of information during continuous operation, the device comprising a pick-up tube having a cathode for generating an electron beam, a central electrode controlling the electron beam current strength, and a target plate which is scanned line-by-line and field-by-field by the electron beam by means of deflection means.

Such a device is disclosed in U.S. Pat. No. 3,602,641. The device, described by way of example of X-ray television, furthermore comprises a dark current compensation circuit. This circuit comprises a store for storing a given dark current setting, the value of which is determined during a field scan of the target plate when no light originating from a scene to be televized is incident on the pick-up tube target plate. It is described that the dark current information is recorded and processed after at least some field periods after a scene information recording, or video recording, has been terminated.

During a temporary interruption of the information recording, the information being either scene (or video) information or dark current information, the line-by-line and field-by-field scanning of the target plate can either be continued or be stopped. Stopping the scanning operation for some time has the drawback that during this period of time the target plate will carry an ever-increasing charge caused by the dark current in the target plate. This means that before a next information recording can be performed, the target plate must first be scanned during one or several field periods to remove the charge which is present due to the dark current. If, however, scanning the target plate is not stopped, the target plate would get a negative voltage with respect to the cathode; the stabilization level on the target plate shifts as compared to a normal continuous operation. The velocity distribution of the electrons in the beam is the cause thereof: the higher velocity electrons will be able to reach this plate in spite of a negative charge on the target plate, the negative charge being associated with an equilibrium state wherein the plurality of high-speed electrons which still reach the target plate are compensated for by the leakage, which corresponds to the dark current, in the target plate. At this dark current scan, the target plate may have in practice a voltage of, for example, approximately $-1V$ at the free surface area which is scanned by the electron beam, instead of approximately the ground potential of $0V$ which the electron beam has (on an average) in situ of the target plate. Since in the subsequent amplifier circuits, a picture signal generated by the pick-up tube is subjected to a dark current setting, which must be performed with respect to the ground potential which serves as a the black reference level, the signal information is clipped at the black level in response to the negative shift, which signal clipping may produce a loss of picture information and a reduced picture contrast, depending on an automatic gain control. To prevent negative charging of the free surface of the target plate the proposition might be put forward to increase the dark current artificially by irradiating the target plate by means of an additional, weak light source. This has the drawback that the additional light source must be able to irradiate the target plate uniformly, while local absorption differences in the glass wall onto which the target plate has been applied in the pick-up tube result in a non-uniform pattern.

SUMMARY OF THE INVENTION

It is an object of the invention to provide a television pick-up device wherein none of the said problems are encountered in a discontinuous information recording during continuous operation.

A device according to the invention is therefore characterized in that the pick-up device comprises a supply circuit the output of which is connected to the cathode of the pick-up tube, a lower or a higher voltage being present during operation at the output when information is recorded or not recorded, respectively.

The result is that when information is recorded, video information or dark current information as indicated in the above-mentioned U.S. patent, picture signal generation is done relative to the correct cathode reference level, whereas the increased voltage at the cathode at the continuous scanning, with the sole purpose of stabilizing the target plate, without information recording and processing, prevents the stabilization level on the target plate from changing, that is to say from becoming more negative.

A television pick-up device comprising a simple implementation of the switched supply circuit is characterized in that the supply circuit comprises a switch, a control input of which is connected to an input of the supply circuit for switch-on/off purposes, which switch short-circuits and releases, respectively, an adjustable voltage source connected to the cathode of the pick-up tube when information is recorded or not recorded, respectively.

A further implementation is characterized in that in the supply circuit the output of the said adjustable voltage source is connected to the base of a transistor, the emitter of which is connected to the cathode of the pick-up tube and the collector to the output of a second adjustable voltage source through a resistor. An advantage is that the current strength of the electron beam in the pick-up tube can be adjusted in a simple manner to the desired value by means of the second adjustable voltage source.

A television pick-up device wherein further a stabilization of the current strength of the electron beam in the pick-up tube is effected is characterized in that the collector of the said transistor is connected to an input of a current stabilization circuit for the electron beam in the pick-up tube, an output thereof being coupled to the control electrode of the pick-up tube, which stabilization circuit comprises an on/off switch connected to the input, which is switched off during line and field blanking period and switched on outside these periods, an integration circuit and a subsequent current source circuit, connected to the output, being provided behind the switch.

A television pick-up device, comprising another simple implementation of the switched supply circuit, is characterized in that the supply circuit comprises a switch, a control input of which is connected for switch-on/off purposes of the switch to an input of the supply circuit, this switch being provided between an adjustable voltage source and the cathode of the pick-up tube which is further connected to a d.c. voltage source present in the supply circuit, through a resistor.

A television pick-up device, wherein further a stabilization of the current strength of the electron beam in the pick-up tube is effected, is characterized in that the device comprises a current stabilization circuit for the electron beam in the pick-up tube, an input and an output, of this circuit being coupled to the cathode and the control electrode, respectively, of the pick-up tube, the stabilization circuit comprising an on/off switch connected to the input, which is switched off during line and field blanking periods and, in the periods of time in which the switch in the supply circuit is switched on, a storage capacitor and buffer stage, and a subsequent current source connected to the output, being provided behind the said circuit.

DESCRIPTION OF THE DRAWINGS

The invention will be further explained by way of non-limitative example with reference to the following Figures, wherein.

DESCRIPTION OF THE PREFERRED EMBODIMENTS

Figure 1:
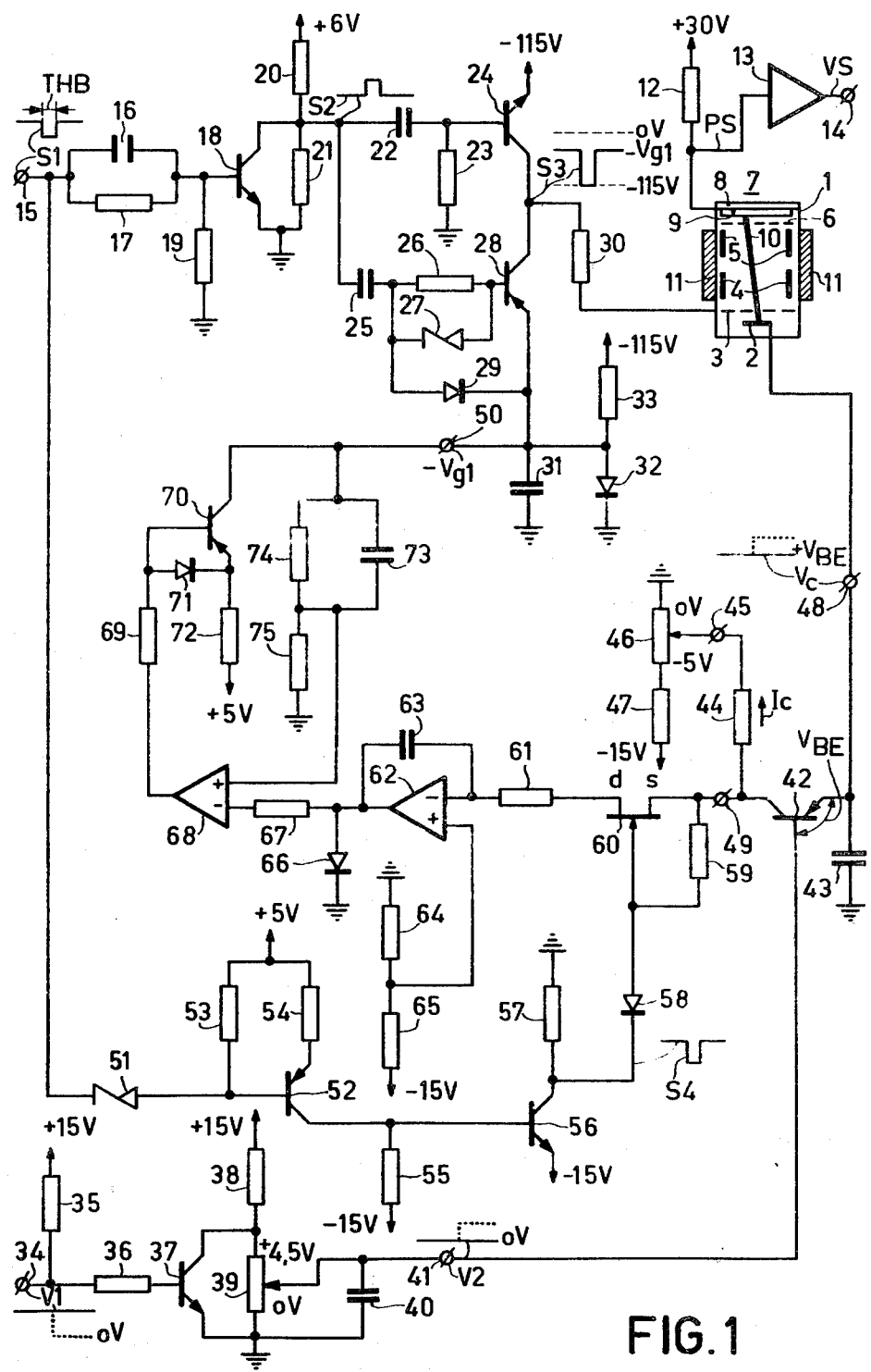
FIG. 1 shows a first implementation of a television pick-up tube according to the invention.

In FIG. 1 reference numeral 1 denotes a television pick-up tube wherein there are indicated schematically and partly in greater detail a cathode 2, a control electrode 3, accelerating electrodes 4 and 5, a mesh electrode 6 and a target plate 7, which is implemented from a transparent, electrically conducting signal electrode 8 and a photosensitive semiconductor layer 9. The cathode 2 produces an electron beam 10 which scans the free surface of the semiconductor layer 9 of the target plate 7 line-by-line and field-by-field by means of deflection means 11. For simplicity the drawing does not show the connections to the electrodes 4, 5 and 6 for the supply of voltages and the connections to the deflections means 11 for the supply of line and field deflection signals, as they are not relevant for the explanation of the operation of the device shown in FIG. 1.

The terminal of the signal electrode 8 of the target plate 7 is connected outside the pick-up tube 1 through a resistor 12 to a terminal carrying a voltage of +30 V and is connected directly to the input of an amplifier circuit 13 having an output 14. The +30 V terminal and other voltage carrying terminals, still to be described hereinafter, are part of voltage sources, the other terminals of which being connected to ground. The circuit 13 to which a picture signal PS is applied is shown, for simplicity, by means of a sole amplifier, but in practice it comprises a pre-amplifier and subsequent amplifiers with automatic gain control and black level clamping, gamma amplifiers, correction circuits for aperture correction etc. It is assumed that the output 14 of the circuit 13 carries, when the pick-up tube 1 records a scene information, a video signal VS which is suitable for reproducing the televised scene. Prior to this a black level setting has been effected in the circuit 13, wherein the black level is allotted as a reference value to a given value of the picture signal PS occurring at the input of the circuit 13.

The picture signal value to which the black level is allotted as a reference value, or, put differently, the picture signal value which is assumed to correspond to black in the televised scene on display, is determined by a few factors, one of which is dependent on the type of pick-up tube 1. Pick-up tubes having a large dark current, that is to say a large leakage current in the photosensitive semiconductor layer 9 if no light coming from the scene is incident thereon, produce a picture signal PS wherein the black level must be put at a higher value than with pick-up tubes having a negligible dark current. In addition, there are pick-up tubes wherein additional illumination of the semiconductor layer is used to reduce inertia phenomena during signal generation, so that the back level must be put at a higher picture signal value. With respect to the influence of the average scene brightness on the black level, the so-called stray light or flare compensation may be mentioned, wherein the black level is influenced by the average value of the picture signal PS.

In a general sense it may be said that a black-reference level is allotted in the circuit 13 to a given value of the picture signals PS applied thereto, a signal clipping or blanking being effected at this reference level so that no lower signal values than black are found in the video signal VS at the output 14. It follows that, at a negative shift in the picture signal PS, the signal clipping or blanking effected in the circuit 13 for values below the black level, which is set at the constant reference level, is effected at a higher signal value in the picture signal. The result is that the clipping is not effected at the black level but at a grey value and, consequently, furnishes a reduced picture information on display.

Figure 2:
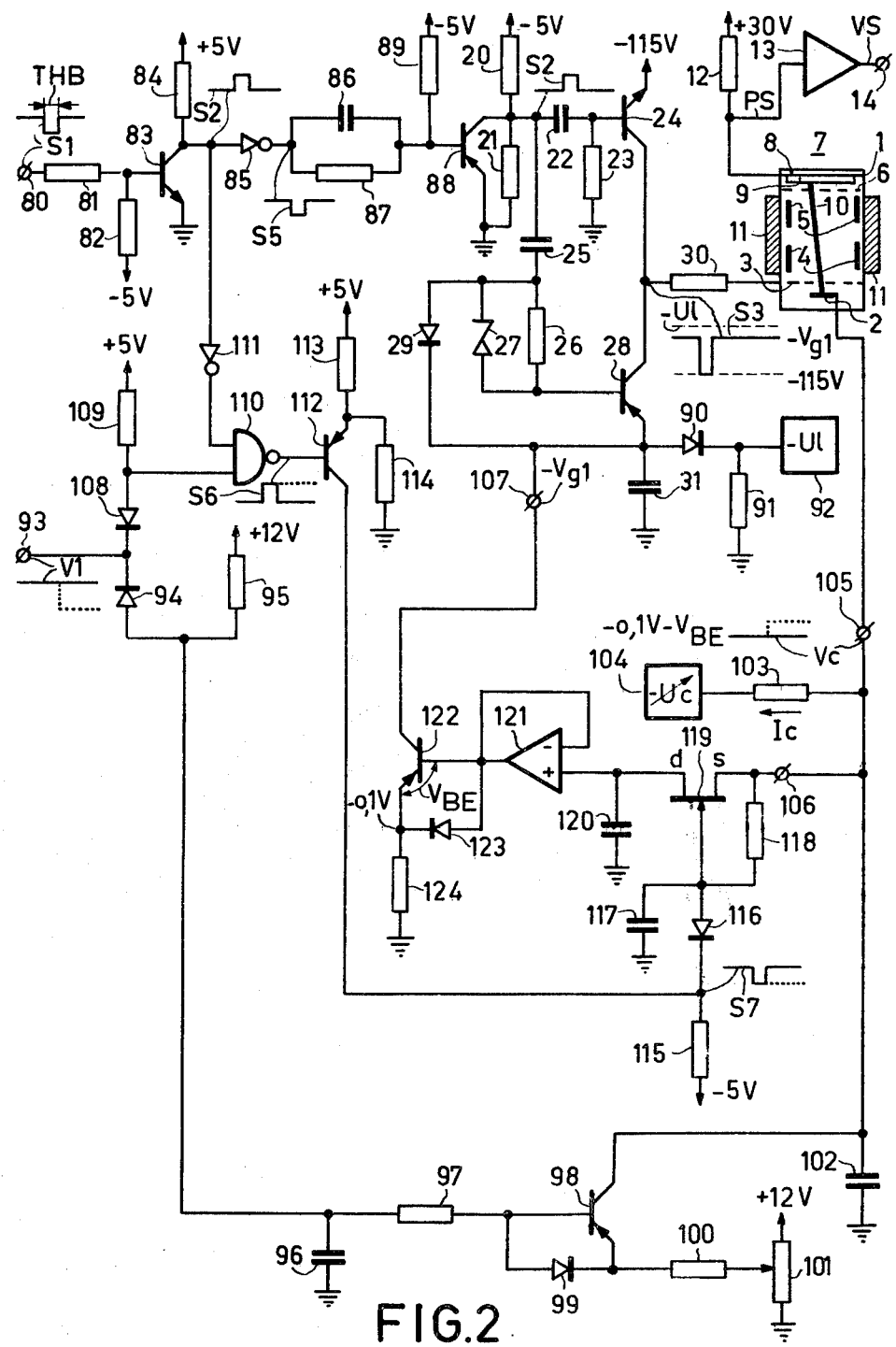
FIG. 2 shows a second implementation.

Such a negative shift in the picture signal PS occurs inversely proportional to the magnitude of the dark current in the semiconductor layer 9 when the target plate 7 is scanned, while no light has been incident on it for some time. The stabilization level on the semiconductor layer 9 then shifts in the negative sense due to the negative charge, which the rapid electrons in the electron beam 10 are able to deposit. A subsequent supply of scene light, and thereafter the processing in a field and frame period, respectively, scanning being either interlaced or not, gives a picture signal PS of a shifted value, which results in a video signal VS clipped in the grey values. The devices shown in FIG. 1 and FIG. 2 are given as examples to avoid the described shift at the discontinuous information recording during continuous operation.

In FIG. 1 reference number 15 denotes an input of the device to which a signal S1 is applied. The signal S1 is shown with one single line blanking pulse, THB, indicating a line blanking period. In addition, the signal S1 comprises periodically produced line and field blanking pulses, not shown. The input 15 is connected to a parallel arrangement of a capacitor 16 and a resistor 17, whose other end is connected directly to the base of an npn transistor 18 and, via a resistor 19, to ground. The collector of the transistor 18 is connected through resistors 20 and 21, respectively, to a terminal carrying a voltage of +6 V and ground, the emitter of the transistor 18 also being connected to ground. The collector of the transistor 18, which carries a signal S2, shown in the drawing, is connected to ground through a capacitor 22 in series with a resistor 23, the capacitor-resistor junction 22, 23 being connected to the base of a npn transistor 24. The emitter of the transistor 24 is connected to a terminal which carries a voltage of −115 V. In addition, the collector of the transistor 18 is connected to the base of a pnp transistor 28 through a capacitor 25 in series with a parallel arrangement of a resistor 26 and a zener diode 27, and to the emitter of the transistor 28 through a diode 29. The interconnected collectors of the transistors 24 and 28, which carry a signal S3, shown in the drawing, are connected to the control electrode 3 of the pick-up tube 1 through a resistor 30. The junction of the emitter of the transistor 28 and the cathode of the diode 29 is connected to ground through a capacitor 31 and through the anode-cathode path of a diode 32 and, through a resistor 33, to a terminal which carries a voltage of $-115$ V. Assuming that the said junction carries a voltage $-V_{g1}$ it follows that the signal S3, shown in FIG. 1, is produced, wherein emitter-collector voltage transients across the alternately conducting transistors 24 and 28 have been neglected. The diode 29 and the zener diode 27 ensure that the transistor 28 will quickly become conductive, while the resistor 26, due to its current limitation, ensures a permanent conduction during a line scan period (for example 52/µs).

Furthermore, the device of FIG. 1 has an input 34 to which a switching voltage V1 is applied. The switching voltage V1 has a value of oV or a positive value, the voltage having the positive value shown by means of a solid line) when information is being recorded, and the value oV (shown by means of a dashed line) when no information is being recorded. The input 34 is connected to a terminal carrying a voltage of $+15$ V through a resistor 35 and to the base of a npn transistor 37 through a resistor 36. The collector of the transistor 37 is connected to a terminal carrying a voltage of and to ground through a resistor 38 and a potentiometer 39, respectively, the emitter thereof also being connected to ground. The tap of the potentiometer 39 is connected to ground through a capacitor 40. The transistor 37 operates as an on/off switch, the base thereof as the control input, so that when the switching voltage V1 is applied, an output 41 of an adjustable voltage source (38–41) thus formed carries a voltage V2, shown in the drawing. A setting range from oV to $+4.5$ V, when the transistor 37 is cut off or the voltage source (38–41) is released, is shown in the drawing by way of example. When the transistor 37 conduits, the oV ground potential is present in the voltage V2, leaving the voltage drop across the emitter-collector path of the transistor 37 and the position of the potentiometer tap out of account.

The output 41 of the adjustable voltage source (38–42) is connected to the base of a pnp transistor 42 whose emitter is connected to ground through a capacutor 43 and also to the cathode 2 of the pick-up tube 1. Through a resistor 44, the collector of the transistor 42 is connected to an output 45 of an adjustable voltage source (45–47) which includes a potentiometer 46 and a resistor 47 arranged in series between ground and a terminal which carries a voltage of $-15$ V, the potentiometer 46 tap being connected to the output 45. Reference numeral 48 denotes the output of a supply circuit (34–48) thus formed thus which is connected to the cathode 2 of the pick-up tube 1 and which carries the voltage Vc shown in the drawing. The voltage Vc exceeds the voltage V2 by the base-emitter threshold voltage $V_{BE}$ of the transistor 42.

It appears that the supply circuit (34–48) supplies a lower voltage (shown by means of a solid line in the voltage Vc) and a higher voltage (shown by means of a dashed line), respectively, to the cathode 2 of the pick-up tube 1 which information is recorded and not recorded, respectively, during operation. The higher value of Vc can be adjusted at will by means of the voltage source (38–42). Depending on this circumstances, the setting is done so that during scanning of the target plate 7 the stabilization level of the semiconductor layer 9 present during the preceding information recording does not change during the period of time no information is being recorded and processed. When no information is being recorded and the target plate 7 is scanned continuously, the increase of the voltage on cathode 2 prevents the surface of the semiconductor layer 9 from being subjected to a negative charge shift, compared to the situation in which information is recorded.

The cathode current Ic shown in the drawing at the resistor 44 can be adjusted by means of the adjustable voltage source (44–47). The voltage of the potentiometer 46 may for example be adjusted between 0 and $-5$ V. It will appear that the adjusted cathode current Ic is not influenced by the lower and the higher voltage applied to the base of the transistor 42, but the emitter will get a similar voltage change, which is however, not higher than for the amount of the base-emitter threshold voltage $V_{BE}$.

To perform a current stabilization of the cathode current Ic, the junction of the collector of the transistor 42 and the resistor 44 is connected to an input 49 of a current stabilization circuit, still further to be described hereinafter, which is connected by means of an output 50, which carries the voltage $-V_{g1}$, to the voltage-carrying terminal of the capacitor 31. In the current stabilization circuit the input 15 is connected to the cathode of a zener diode 51, the anode of which is connected to the base of a pnp transistor 52 and, in addition, to a voltage of terminal which carries a $+5$ V, through a resistor 53. Through a resistor 54 the emitter of the transistor 52 is connected to the terminal carrying the $+5$ V. The collector of the transistor 52 is connected through a resistor 55 to a terminal carrying a voltage of $-15$ V and to the base of a npn transistor 56. The emitter of the transistor 56 is connected to a terminal carrying a voltage of $-15$ V and the collector thereof is connected to ground, through a resistor 57, and to the cathode of a diode 58 which carries a signal S4, shown next to it in the drawing. Through a resistor 59, the anode of the diode 58 is connected to a source (s) of a field effect transistor 60 whose gate electrode is connected to the anode of the diode 58. The drain (d) of the transistor 60 is connected to a ($-$) input of an operational amplifier 62 through a resistor 61. The ($-$) input is connected to the output of the amplifier 62 through a capacitor 63, whereas the ($+$) input is connected to the junction of two resistors 64 and 65 which are arranged in series between ground and a terminal which carries a voltage of $-15$ V. A resultant voltage of, for example, $-1$ V is present at the ($+$) input of the amplifier 62. The output of an integration circuit (61–65) thus formed is connected both to the anode of a diode 66 which is connected to ground by means of the cathode thereof, and to the ($-$) input of an operational amplifier 68 through a resistor 67. The diode 66 is provided for protection purposes and prevents the output of the integration circuit (61–65) from becoming more positive than the anode-cathode threshold voltage of the diode 66.

The output of the amplifier 68 is connected to the base of a transistor 70 and to the anode of a diode 71 through a resistor 69. The emitter of the transistor 70 and the cathode of the diode 71 are connected to a terminal carrying a voltage of $+5$ V through a resistor 72. The collector of the transistor 70 is connected to the output 50 which is further connected to a terminal of a parallel arrangement of a capacitor 73 and a resistor 74, the other terminal of which is connected to the (+) input of the amplifier 68 and, through a resistor 75, to ground. A current stabilization circuit (49–75) is thus formed, the output of the integration circuit (61–65) being connected to the output 50 through a current source circuit (66–75).

The operation of the current stabilization circuit (49–75) can be explained as follows. Under the control of the signal S4 shown in FIG. 1, the transistor 60 operates as an on/off switch which is switched off during line and field blanking periods and which is switched on outside these periods in line scanning periods. In the equilibrium condition of the current stabilization circuit (49–75), the voltage (of −1 V) at the junction of the resistors 64 and 65 is also present at the (−) input of amplifier 62 and the input 49 is at a preset, or given, value of the current Ic. It is now assumed that the cathode current Ic becomes lower. The more negative voltage at the input 49 through the conducting transistor 60, results in that the voltage at the output of the amplifier 62 becomes less negative. The less negative voltage at the (−) input of the amplifier 68 gives a less positive voltage at the output of the amplifier 68. Consequently, the transistor 70 starts conducting more current so that the voltage $-V_{g1}$ at the output 50 becomes less negative. In this situation the voltage at the (+) input of the amplifier 68 becomes also less negative to such an extent that a new equilibrium situation with substantially equal voltages at the (+) and (−) input of the amplifier 68 is obtained through the feedback circuit (69–75). The result is that the voltage $-V_{g1}$ becomes less negative whereby an increase in the cathode current Ic is produced, which increase counteracts the assumed reduction of the cathode current Ic. A similar reasoning, with opposite effect is valid for a cathode current increase, so that a current stabilization occurs.

For completeness', it should be noted that the current Ic, flowing through the resistor 44, is substantially equal to the current produced by the cathode 2 in the pick-up tube 1. In the equilibrium condition the current stabilization circuit (49–75) does not take up current and the collector current of the transistor 42 (Ic) is equal to the emitter current flowing through the cathode 2 if the base current of the transistor 42 is neglected. This relationship is independent of the presence of the lower or the higher voltage value in the voltage Vc at the output 48. It is true that the supply of the higher value in the voltage V2 to the base of the transistor 42 results, in the first instance, in that the current Ic through the resistor 44 decreases, but the decrease is controlled out by means of the current stabilization circuit (49–75) and the adjusted, given, current Ic, together with the −1 V voltage at the input 49, occurs again, the voltage increase at the base being also present at the emitter of transistor 42 and the cathode 2. A return to the lower value in the voltage V2 (information recording) produces the reverse effect, whereby the matching of the equilibrium condition of the current stabilization circuit (49–75) does in practice not noticeably influence the information recording.

FIG. 2 shows a seconnd implementation of the television pick-up device wherein the components 1 to 14 inclusive and 20 to 31 inclusive which are used in an identical manner as in the device of FIG. 1, have been given the same reference numerals. Reference numeral 80 denotes an input of the device to which the signal S1 is applied. Through two resistors 81 and 82 the input 80 is connected in series to a terminal carrying a voltage of −5 V. The junction of the resistors 81 and 82 is connected to the base of a npn transistor 83. The emitter of the transistor 83 is connected to ground and the collector to a terminal carrying a voltage of +5 V, through a resistor 84. Through an inverter 85, the collector of the transistor 83, with the signal S2 thereupon, is connected to a parallel arrangement of a capacitor 86 and a resistor 87, at which junction the signal S5 of the drawing is produced. The other end of the parallel circuit (86, 87) is connected to the base of a pnp transistor 88 which is further connected to a terminal carrying a voltage of −5 V, through a resistor 89. In the manner described with reference to FIG. 1 for the npn transistor 18, the pnp transistor 88 is arranged in parallel with the resistor 21. The signal S2 shown in FIG. 2 is obtained by means of the components 81 to 89 inclusive. A further difference with respect to the device of FIG. 1 is that the voltage-carrying terminal of the capactior 31 is connected to ground through a diode 90 and a series resistor 91, while the diode-resistor junction is connected to the output of a voltage source 92. The voltage source 92 produces a voltage −U1 which is plotted as the limit voltage at the signal S3. Instead of a negative current supply to the capacitor 31 in the manner shown in FIG. 1, through the resistor 33, a negative current supply is effected in FIG. 2 through the transistor 28 and 24, namely when the leading and the trailing edges of the pulses in the signal S2 are produced when, one of the transistors is cutoff when and the other transistor becomes conductive.

Reference numeral 93 denotes an input to which the switching voltage V1 is applied. Through a diode 94 the input 93 is connected in series with a resistor 95 to a terminal carrying a voltage of +12 V. The anode of the diode 94 is connected to ground through a capacitor 96 and to the base of a pnp transistor 98 and the anode of a diode 99 through a resistor 97. Through a resistor 100 the emitter of the transistor 98 and the cathode of the diode 99 are connected to the tap of a potentiometer 101 arranged between ground and a terminal carrying a voltage of +12 V. The resistor 100 and the potentiometer 101 constitute an adjustable voltage source (100, 101) which is connectable through transistor 98, which operates as a switch, to the cathode 2 of the pick-up tube 1. The collector of the transistor 98 is further connected to ground through a capacitor 102 and to the output of an adjustable voltage source 104 through a resistor 103. Reference numeral 105 denotes an output of a supply circuit (93–105) which produces the cathode voltage Vc shown next to it in the drawing. The voltage Vc has a lower and a higher voltage value, respectively, in dependence on the switching voltage V1 which is applied to the control input (base) of the transistor switch 98 for switch-off/on purposes. The adjustable voltage source 104 serves to produce a voltage −Vc by means of which a cathode current Ic, flowing through the resistor 103, can be set.

To perform a current stabilization of the cathode current Ic the junction of the resistor 103 and the cathode 2 is connected to an input 106 of a current stabilization circuit, still further to be described, which is connected by means of an ouput 107, which carries the voltage $-V_{g1}$, to the voltage-carrying terminal of the capacitor 31. The input 93 having the switching voltage V1 is connected to the cathode of a diode 108, the anode of which is connected to a terminal carrying a voltage of +5 V through a resistor 109 and directly to an input of a NAND gate 110. The other input of gate 110 is connected to the collector of the transistor 83 through an inverter 111. The output of the gate 110 carries the signal S6, shown next to it in the drawing, under the influence of the signal S2 and the switching voltage V1. For the higher value, which corresponds to a logic 1, in the voltage V1 (information recording), the signal S6 is equal to the signal S2 with the line and field blanking pulses. When no information is recorded, the gate 110 supplies a higher voltage value (logic 1) under the influence of the lower value, which corresponds to the logic 0, in voltage V1.

The output of the gate 110 is connected to the base of a pnp transistor 112 the emitter of which is connected to a terminal which carries a voltage of +5 V and to ground, respectively, through resistors 113 and 114, respectively. The collector of the transistor 112 is connected to a terminal, carrying a voltage of −5 V, through a resistor 115 and to the cathode of a diode 116. The junction of the resistor 115 and the diode 116 carries the signal S7, shown next to it in the drawing. The anode of the diode 116 is connected to ground through a capacitor 117 and is connected through a resistor 118 to the input 106 to which, in addition, the source (s) of a field effect transistor 119 is connected. The anode of the diode 116 is connected directly to the gate electrode of the transistor 119, whose drain (d) is connected to ground through a storage capacitor 120 and directly to the (+) input of an operational amplifier 121. The (−) input of the amplifier 121 is connected to the amplifier output which is further connected to the base of a pnp transistor 122 and to the anode of a diode 123. The emitter of the transistor 122 and the cathode of the diode 123 are connected to ground through a resistor 124. The collector of the transistor 122 is connected to the output 107 of a current stabilization circuit (106-124) thus formed, which comprises an on/off switch (119), which is switched off in the line and field blanking periods and in the periods of time the switch (98) in the supply circuit (93-105) for the cathode 2 of the pick-up tube 1 is switched on, and further a storage capacitor 120, a buffer stage (121) and a current source (122-124).

The operation of the current stabilization circuit (106-124) can be explained as follows. In FIG. 2 it is shown that, for a given desired cathode current Ic in the equilibrium condition of the stabilization circuit (106-124) the emitter of the transistor 122 carries a voltage of, for example, −0.1 V. The base of the transistor 122 has a value which is more negative by the amount of the base-emitter threshold voltage $V_{BE}$, which value must also be present at the input 106, through the buffer stage 121, and, consequently, at the input 105 (−0.1 V-$V_{BE}$). If now the present current Ic becomes too small for some reason, the voltage at the input 106 becomes more negative through the resistor 103, which more negative voltage is also present at the base of the transistor 122 through the transistor 119, the storage capacitor 120 and the amplifier 121, and the current source (122-124) starts applying a larger current to the capacitor 31, so that the voltage −$V_{g1}$ becomes less negative, in response to which the cathode current Ic increases. It appears that the current stabilization circuit (106-124) counteracts a change in the cathode current Ic, which was adjusted by means of the voltage source −Uc. The resistor 103 acts as a measuring resistor.

In contradistinction to the current stabilization circuit (49-75) shown in FIG. 1, the circuit (106-124) of FIG. 2 is switched off (signal S7) when the increased voltage value in the voltage Vc is supplied to the cathode 2. A reason thereof is that the current Ic, flowing through the resistor 103, is only equal to the cathode current when the transistor 98 is cut off. A correct cathode current stabilization is then effected. When the transistor 98 conducts, the current Ic is equal to the sum of the currents flowing through the cathode 2 and the transistor 98. If, when no information is recorded, the circuit (106-124) would not be switched off, this would results in that this circuit arrives in an entirely different equilibrium condition wherein the summed current Ic has the preset value. Proceeding thereafter to information recording would give that the current stabilization circuit (106-124) must return to the first equilibrium condition. To avoid this the interruption of the operation of the current stabilization circuit (106-124) is done when no information is being recorded.

The pick-up tube 1 has been described for an implementation wherein the traget plate 7 has a photosensitive semiconductor layer. For X-ray television this means that a X-ray image intensifier must be provided in front of the pick-up tube 1, which image intensifier converts the X-ray pattern into an optical image which is projected on the target plate of the pick-up tube 1. Instead of to such a X-ray television pick-up device with separate X-ray image intensifier and pick-up tube, thoughts might go towards a device having a sole X-ray pick-up tube wherein the optical intermediate image does not occur but wherein electrons, corresponding to an X-ray image, are directly incident on a target plate formed by a silicon layer wherein a matrix of diodes is disposed. Also here a negative charging of the target plate is effected by the rapid electrons in the electron beam which scans the target plate, when scanning is continued when information recording is interrupted.

What is claimed is:

1. A television pick-up device suitable for a discontinuous recording of information during continuous operation, the device comprising a pick-up tube having a cathode for generating an electron beam, a control electrode for controlling the electron beam current strength, and a target plate which is scanned line-by-line and field-by-field by the electron beam by means of deflection means, wherein the pick-up device further comprises a supply circuit coupled to the cathode of the pick-up tube, said supply circuit having means for providing a first voltage level to the cathode when information is being recorded by said pick-up device, and a second voltage level to the cathode when information is not being recorded, said second voltage level being higher than said first voltage level, whereby said second voltage level prevents said target plate from becoming more negative when information is not being recorded.

2. A television pick-up device as claimed in claim 1, wherein said providing means of said supply circuit comprises an adjustable voltage source coupled to the cathode of said pick-up tube, and a switch having a control input connected to an input of said supply circuit, said switch being coupled to said adjustable voltage source for short-circuiting said adjustable voltage source when information is being recorded.

3. A television pick-up device as claimed in claim 2, wherein the supply circuit providing means further comprises a transistor, having the base thereof coupled to said adjustable voltage source and the emitter thereof coupled to the cathode of said pick-up tube, a second adjustable voltage source, and a resistor coupling the second adjustable voltage source to the collector of said transistor.

4. A television pick-up device as claimed in claim 3, wherein said supply circuit providing means further comprises a current stabilization circuit, for the electron beam of the pick-up tube, having an input also coupled to the collector of said transistor and an output coupled to the control electrode of the pick-up tube wherein said stablization circuit comprises an on/off switch connected to the input of said stabilization circuit, said switch being switched off during line and field blanking periods, an integration circuit, having an input coupled to said switch and an output, and a current source circuit coupled to the output of said integration circuit.

5. A television pick-up device as claimed in claim 1, wherein the supply circuit providing means comprises a switch coupled to the cathode of said pick-up tube, said switch having a control input connected to an input of said control circuit, an adjustable voltage source coupled to said switch, and a d.c. voltage source also coupled to said cathode.

6. A television pick-up device as claimed in claim 5, wherein said supply circuit providing means further comprises a current stabilization circuit, for the electron beam in the pick-up tube, having an input coupled to the cathode and an output coupled to the control electrode of the pick-up tube, wherein the current stabilization circuit comprises an on/off switch connected to the input of said stabilization circuit, said switch being switched off during line and field blanking and during the periods of time in which the switch in the supply circuit providing means is switched on, a storage capacitor coupled to said switch, a buffer stage also coupled to said switch, and a current source coupled to said buffer stage.

* * * * *